United States Patent [19]

Armond et al.

[11] Patent Number: 5,013,984
[45] Date of Patent: May 7, 1991

[54] INDICATOR FOR A RECIPROCATING MEMBER

[75] Inventors: Joseph A. Armond, River Grove; Juanito Rodenas, Carol Stream, both of Ill.

[73] Assignee: Electro-Matic Products Co., Chicago, Ill.

[21] Appl. No.: 513,116

[22] Filed: Apr. 23, 1990

Related U.S. Application Data

[62] Division of Ser. No. 370,198, Jun. 22, 1989, Pat. No. 4,947,090.

[51] Int. Cl.⁵ ............................................. G01R 29/00
[52] U.S. Cl. ..................................... 318/490; 318/652
[58] Field of Search ............... 318/282, 466, 467, 468, 318/490, 560, 565, 626, 627, 652

[56] References Cited

U.S. PATENT DOCUMENTS

| | | | |
|---|---|---|---|
| 3,394,292 | 7/1968 | Flum | 318/626 |
| 3,504,246 | 3/1970 | Russell et al. | 318/652 |
| 3,714,537 | 1/1973 | Bur | 318/626 |
| 4,024,767 | 5/1977 | Kampf | 73/866.1 |
| 4,190,792 | 2/1980 | Chan | 318/663 |
| 4,242,621 | 12/1980 | Spaulding | 318/600 X |
| 4,694,390 | 9/1987 | Lee | 364/165 |
| 4,961,269 | 10/1990 | Luttmer et al. | 33/706 |

Primary Examiner—Bentsu Ro
Attorney, Agent, or Firm—Paul H. Gallagher

[57] ABSTRACT

A reciprocating member has a series of LED's arranged in a signal line corresponding to the main line of movement of the reciprocating member. Associated with the LED's are dot-bar drivers, controlled by voltage for energizing the LED's serially, along the signal line according to the position of the reciprocating member along its main line. Traverse potentiometers are provided for actuation by the reciprocating member for controlling voltage applied to the LED's, and manually adjustable remote potentiometers oppose the voltage controlled by the traverse potentiometers.

9 Claims, 8 Drawing Sheets

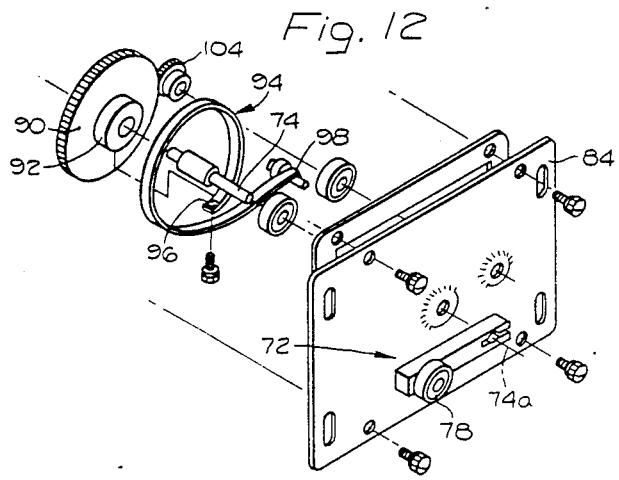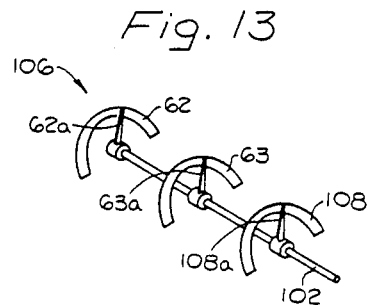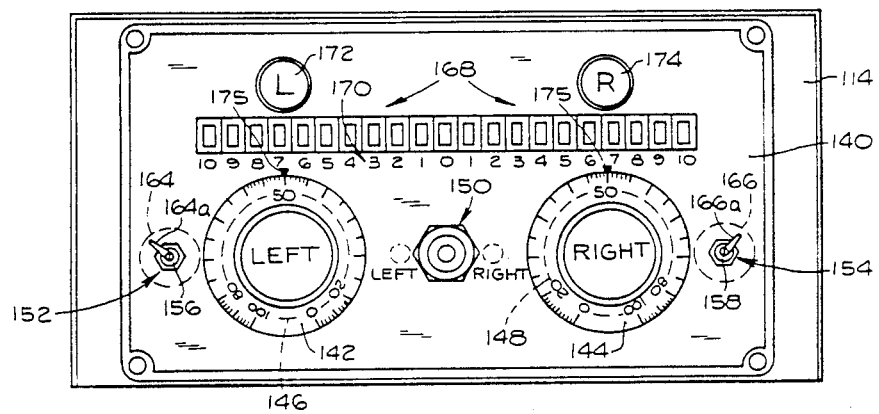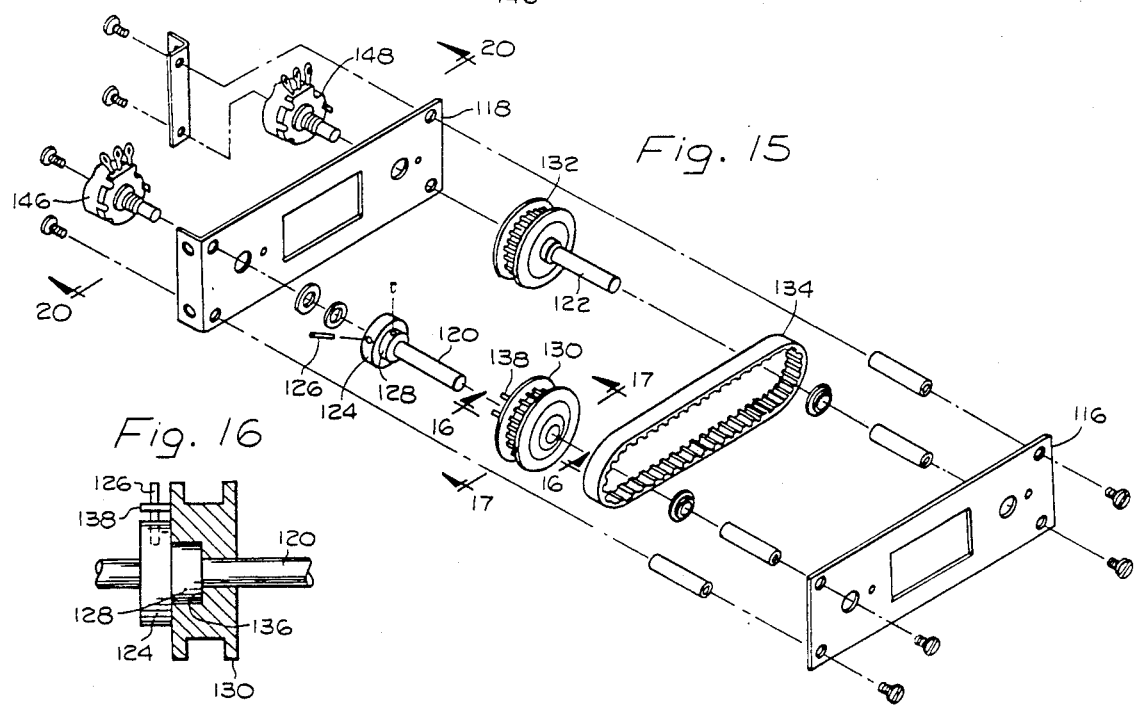

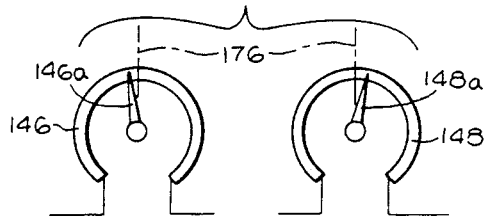
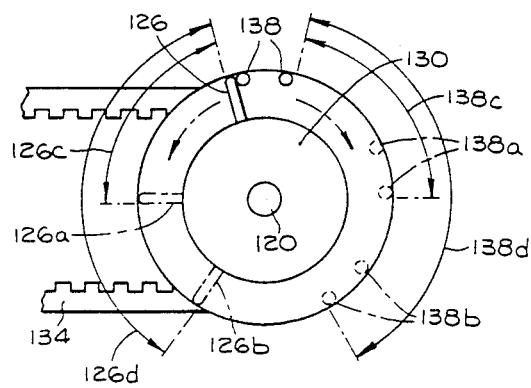
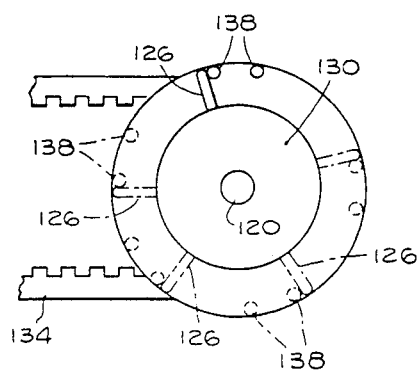
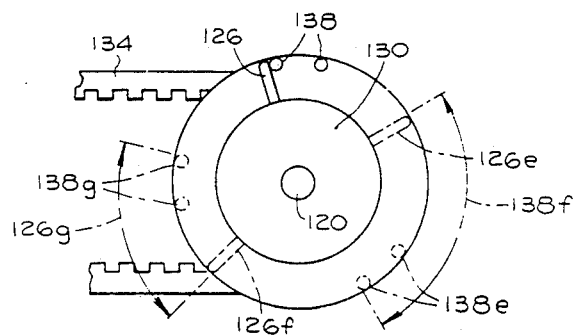
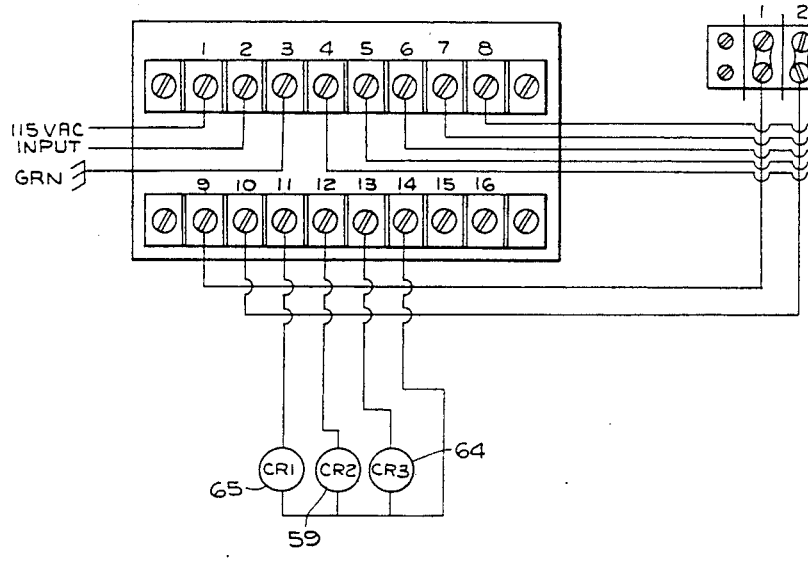
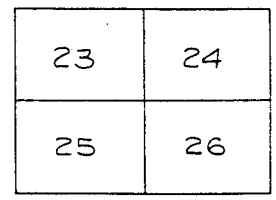

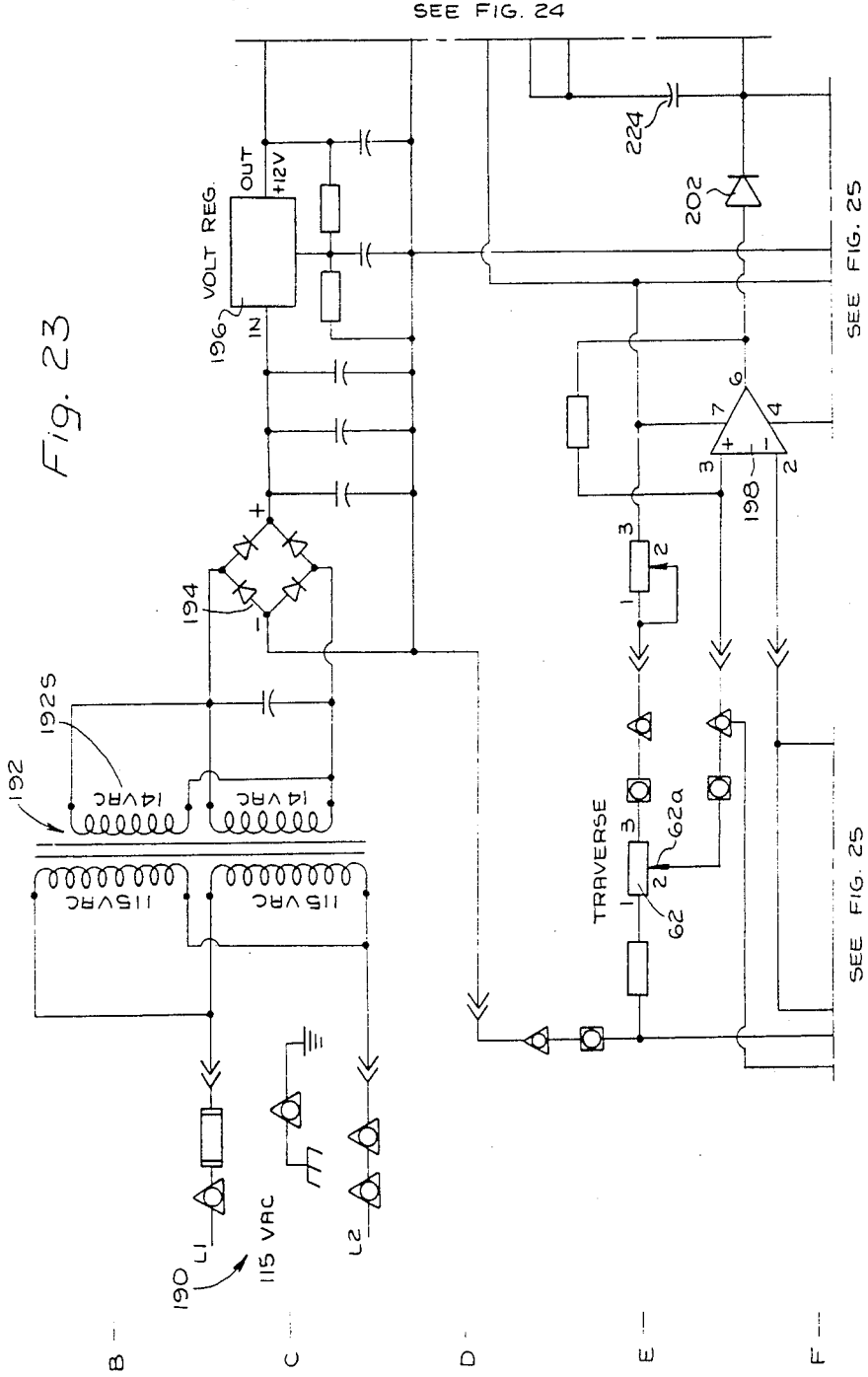

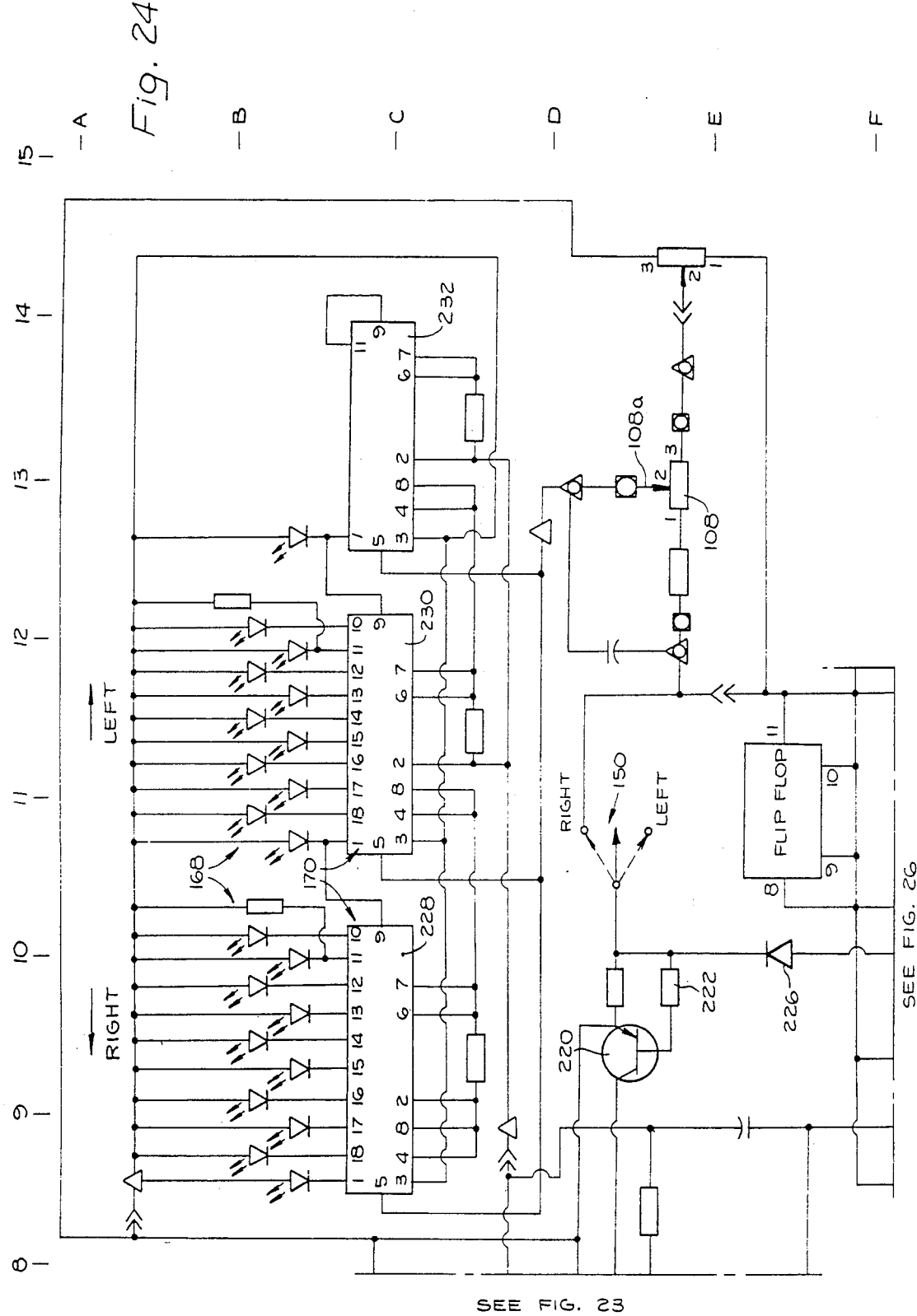

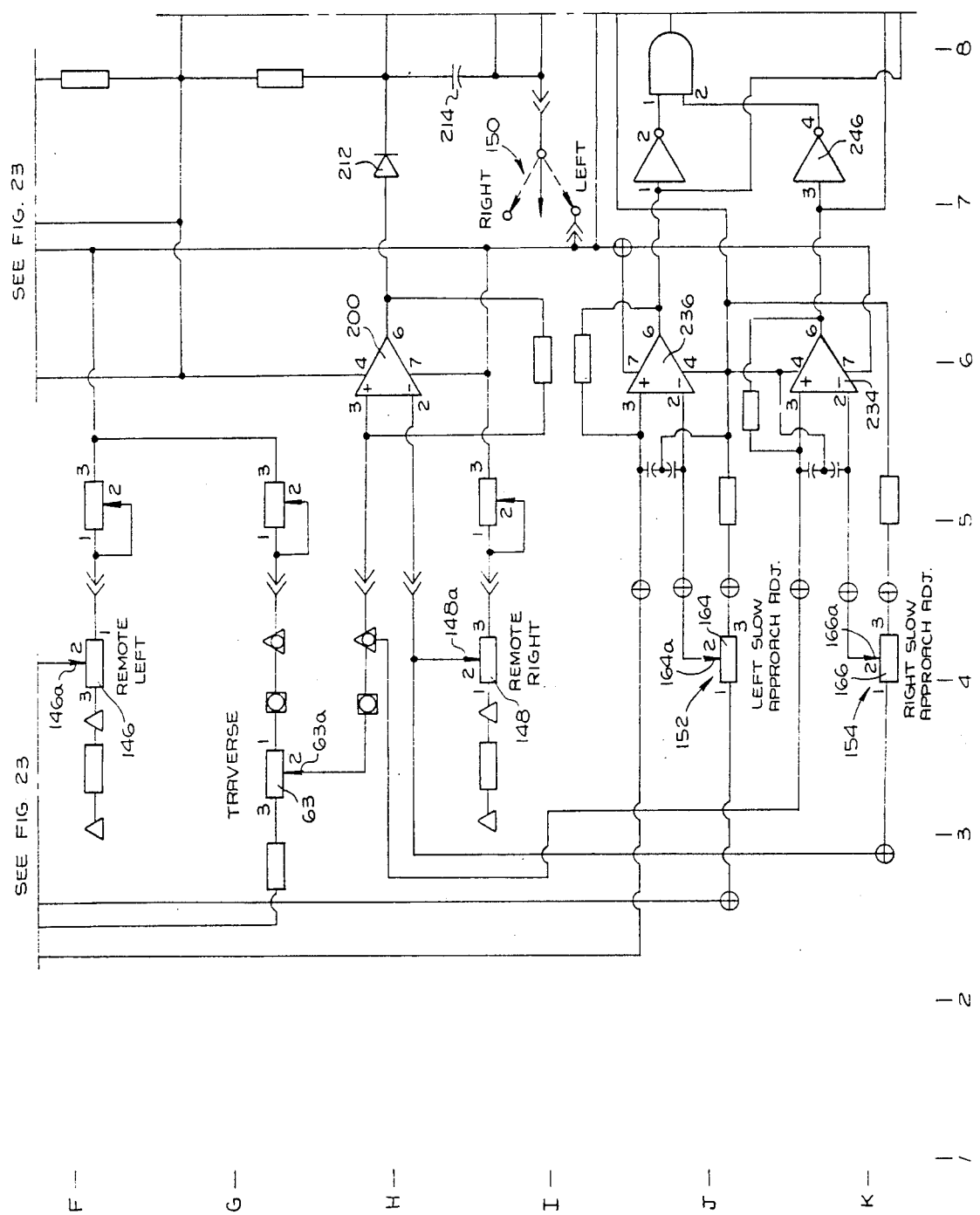

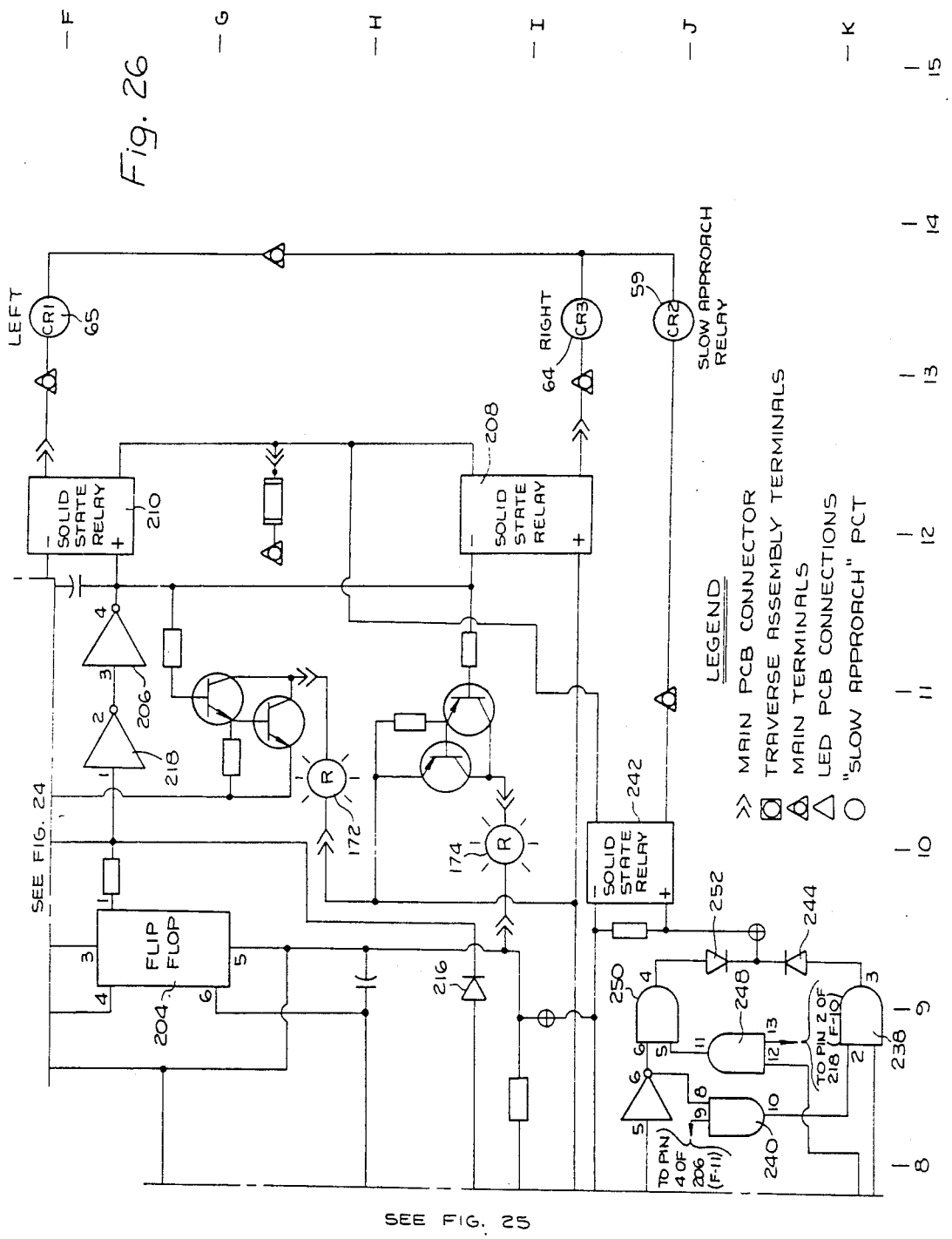

INDICATOR FOR A RECIPROCATING MEMBER

This is a division of our prior and co-pending parent application, Ser. No. 07/370,198, filed June 22, 1989, now U.S. Pat. No. 4,947,090.

SUMMARY OF THE INVENTION

While the invention in the parent application referred to, is directed to a reciprocating part in a machine tool (e.g. grinder) and related parts and components, the present invention relates to the broader or more generic aspect of indicating the position of a reciprocating member, which may be in any of a wide variety of instrumentalities or operational settings.

A broad obJect of the invention is to provide means for visually indicating the position of the reciprocating member in any part of a maximum range that the member is capable of moving through, and additionally, utilizing the controls that are used for driving and controlling the movements of the table, for so indicating the position thereof.

Another obJect is to provide such means that incorporates a novel solid state electronic circuit, greatly simplifying the apparatus.

In the following detailed disclosure which is essentially the same as that of the parent application, the table (FIG. 1) or the carriage (FIG. 3) constitutes a reciprocable member within the scope of the present invention.

BRIEF DESCRIPTION OF THE SEVERAL VIEWS OF THE DRAWINGS

FIG. 12 is a view similar to the righthand portion of FIG. 11, but with certain elements in reverse positions.

FIG. 13 is a semi-diagrammatic view of potentiometers or rheostats contained in the unit of FIG. 11.

FIG. 14 is a front face view of a remote control unit mounted on the grinder.

FIG. 15 is a perspective, exploded view of the elements contained within the remote control unit shown in FIG. 14.

FIG. 16 is a sectional view taken at line 16—16 of FIG. 15.

FIG. 17 is a semi-diagrammatic view taken at line 17—17 of FIG. 15.

FIG. 18 is a view similar to FIG. 17, but with certain of the elements in different positions.

FIG. 19 is a view similar to FIGS. 17 and 18, but with certain of the elements in still different positions.

FIG. 20 is a semi diagrammatic view oriented according to line 20—20 of FIG. 15.

FIG. 21 is a face view of a terminal mounting plate and related elements of the electrical circuit.

FIG. 22 is a layout of the positional relationship of FIGS. 23-26 showing the electrical circuit.

FIG. 23 is a portion of the electrical control circuit.

FIG. 24 is a portion of the electrical control circuit.

FIG. 25 is a portion of the electrical control circuit.

FIG. 26 is a portion of the electrical control circuit.

DETAILED DESCRIPTION

Figure 1:
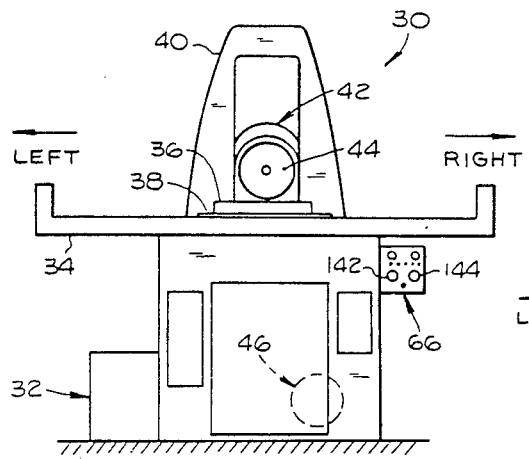
FIG. 1 is a front view of a surface grinder to which the apparatus of the invention is applied

FIGS. 1 and Z show a standard surface grinder 30 having a base 32 on which is mounted a table 34 supporting a workpiece 36 to be ground. The workpiece is held on the table 34 by a magnetic chuck 38. The grinder includes a column 40 at the rear in which is mounted vertically movable grinding head 42 that includes a grinding wheel 44.

In the operation of the grinder, the grinding head is lowered to bring the grinding wheel into engagement with the workpiece for the grinding operation. In this grinding operation, the table 34 is reciprocated horizontally in right/left directions, as indicated, to move the workpiece past the grinding wheel, as the grinding wheel rotates, in engagement therewith. Such a standard grinder is provided with certain driving means and controls that will be referred to later, but which also include for example a motor 46.

The directions of movement of the table, i.e. right-/left movements, are oriented according to viewing the grinder from the front, as in FIG. 1.

Figure 2:
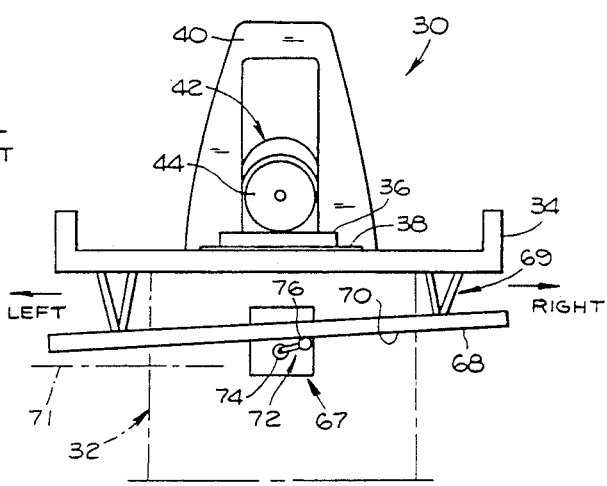
FIG. 2 is a semi-diagrammatic view, similar to FIG. 1.
Figure 3:
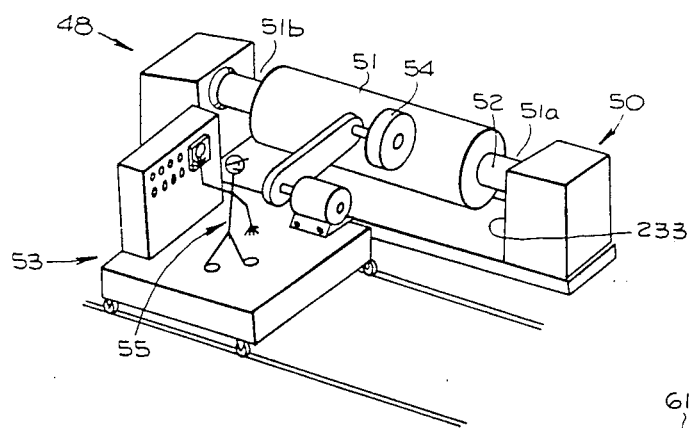
FIG. 3 is a perspective view of a cylinder grinder.
Figure 4:
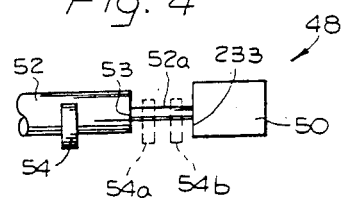
FIG. 4 is a top view of a fragment of the grinder of FIG. 3, at the righthand end thereof.

The standard surface grinder of FIGS. 1 and 2 constitutes the most common case of applying the invention, but it is also applicable to other kinds of machine tools, such as the cylindrical grinder 48 shown in FIGS. 3 and 4 The cylindrical grinder includes a frame 50 in which is mounted a roll 51, such as a steel roll, having a shaft 52, the ends of the roll being spaced from the elements of the frame at 51a, 51b. The cylindrical grinder includes a carriage 53 having a grinding wheel 54 for grinding the steel roll, the carriage being mounted for traveling transversely for moving the grinding wheel along the steel roll. One form of such cylindrical grinder is as shown here, that is, the operator 55 rides on the carriage, but in other forms (not shown) the operator and control station are at a remote location. In either case, in the normal operation of the grinder, the grinding wheel 54 moves into the spaces 51a, 51b, and assumes dot-dash line positions 54a, 54b, shown in the space 51a, which will be referred to again hereinbelow in connection with the "slow approach" feature.

Figure 6:
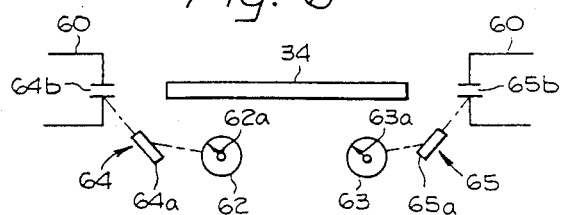
FIG. 6 is a detail of the electrical circuit used in the apparatus of the invention.
Figure 6A:
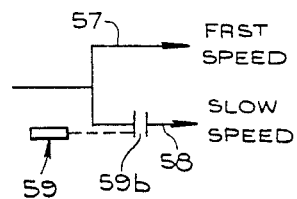
FIG. 6a is a detail of certain elements of the electrical circuit utilized in the cylindrical grinder of FIG. 3.

FIG. 6a shows diagrammatically a detail of the circuit utilized in the "slow approach" mode. A conductor 57 represents fast speed of the carriage, and conductor 58 slow speed. Contacts 59b of a relay 59 are incorporated in the conductor 58. These contacts are normally open, and when they are open, the carriage is moved at fast speed, and when they are closed, as referred to hereinbelow, the carriage is moved at slow speed. It will be understood that this is merely a representation of any of the various ways in which the control can be effected.

In applying the control apparatus of the invention to these machine tools, namely the surface grinder and the cylindrical grinder, the principal consideration is the reciprocating member, i.e. the table 34 (FIGS. 1 and 2) of the surface grinder and the carriage 53 (FIGS. 3 and 4) of the cylindrical grinder, the control apparatus being utilized for controlling such reciprocating movements of those movable members.

Figure 5:
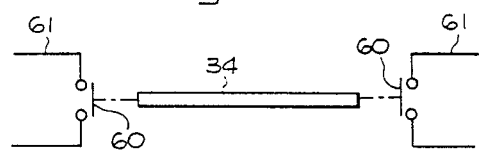
FIG. 5 is a detail of an electrical circuit utilized in the grinder.

Each grinder is provided with standard means for reversing the movement of the reciprocable part. Such is represented diagrammatically in FIG. 5, where the table 34 is shown, and at the ends are switches 60 which upon being actuated by the table, control the reversing of the table. The table may be driven by a hydraulic motor, electrical motor, etc. and need not be described in detail. The switches are incorporated in electrical circuit elements 61, and at the ends of the movement of the table, the respective switches are actuated and the table is reversed. The same operation is utilized in reversing the carriage 53 of the cylindrical grinder of FIG. 3.

The apparatus of the present invention (FIG. 6) utilizes traverse potentiometers or rheostats 62, 63, having arms 62a, 63a, driven by the table. The potentiometers are arranged for controlling voltage for in turn controlling relays 64 and 65, which include electromagnets 64a, 65a, and contacts 64b, 65b, respectively, the contacts being incorporated in the electrical circuit elements 61, of FIG. 5. The following includes detailed description of the operation of the potentiometers and relays, and the components that are controlled by those elements are referred to hereinbelow.

Referring again to the surface grinder of FIGS. 1, 2, the apparatus of the invention includes a remote control unit 66 (FIG. 1) and a traverse control unit 67 (FIG. 2), the details of both of these units being set out hereinbelow. The remote control unit 66 is preferably mounted at the front of the grinder for convenience to the operator, who must utilize it for making various adjustments during a grinding operation. The traverse unit 67 may be mounted in any convenient location, but because the construction and shape of various grinders are different, the details of mounting it are omitted. It is shown in diagrammatic arrangement in FIG. 1, for convenience in showing the RIGHT and LEFT movements of the table, and the functioning of various elements according to those movements.

Figure 10:
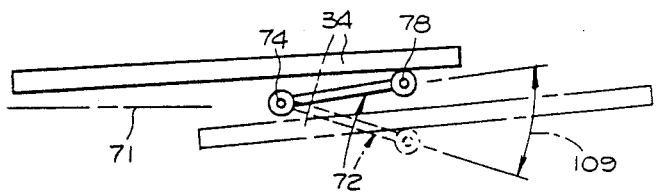
FIG. 10 is a detail view showing certain elements of FIG. 7 in different positions.
Figure 8:
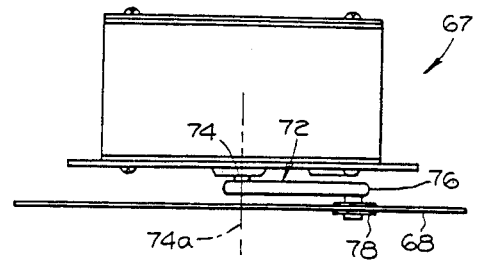
FIG. 8 is a top view of the component shown in FIG. 7.
Figure 9:
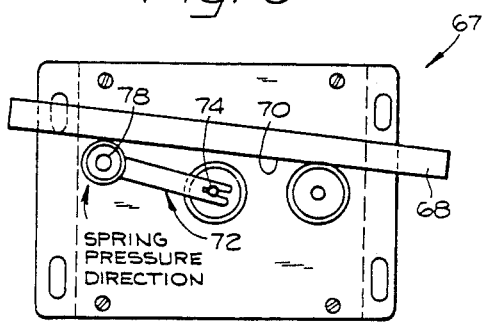
FIG. 9 is a view similar to FIG. 7, but showing certain elements in an alternate position.
Figure 7:
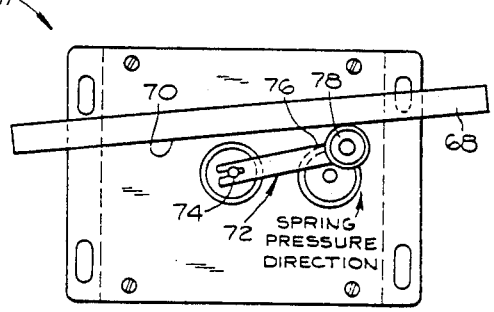
FIG. 7 is a front face view of the traverse unit of the apparatus.
Figure 11:
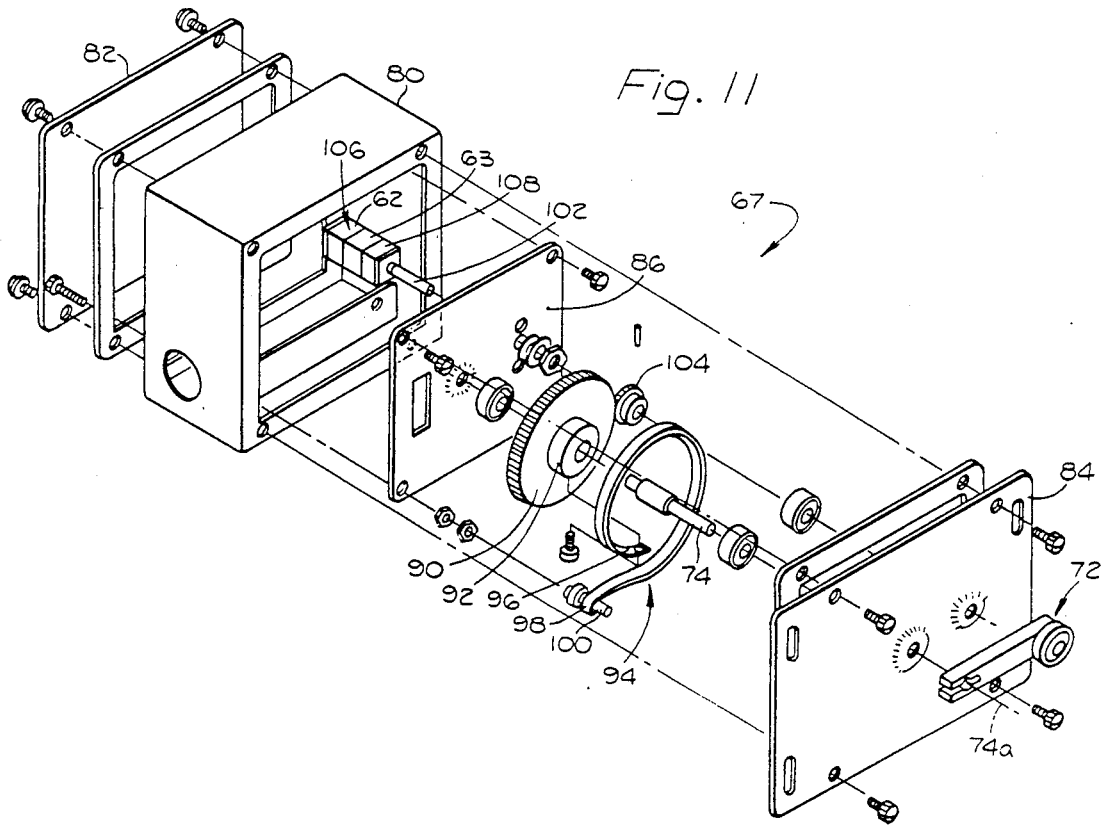
FIG. 11 is an exploded view of the traverse unit of FIGS. 7-9.

For actuating the traverse unit 67, a taper bar 68 is mounted on the table, by convenient means such as indicated at 69, and it of course rides with the table. The taper bar 68 may actually be a parallelogram, but it includes a lower working edge 70 that is inclined to the direction of movement of the taper bar which is horizontally, as indicated by the horizontal reference line 71 (FIGS. 2, 10). The traverse unit 67 includes an exterior actuating arm 72 pivotally mounted on a shaft 74 in the traverse unit, the shaft having an axis 74a (FIG. 11). The actuating arm has a free end 76 on which is mounted a follower roller 78 that engages the lower inclined working edge 70 of the taper bar (FIGS. 7, 9). Further details of this arrangement will be referred to hereinbelow.

Reference is now made to FIGS. 11, 12, showing the details of the traverse unit 67, and in these figures the actuating arm 72 will be observed. The traverse unit includes a housing or casing 80 having a bottom closure element 82 and a top cover 84, as well as a mounting plate 86 in the interior of the housing. The unit includes the shaft 74, also referred to as a main shaft, extending through the top cover 84, on which the actuating arm 72 is mounted, as referred to. Also mounted on the shaft 74 is a spur gear 90, having a hub 92. A coil spring 94 has an inner end 96 secured to the hub 92 and an outer end 98 fixedly secured to a pin 100 mounted on the mounting plate 86.

The traverse unit also includes a supplementary shaft 102 on which is secured a pinion gear 104 in mesh with the spur gear 90. It will be noted that the spur gear 90 is of relatively great size and the pinion gear 104 of greatly reduced size.

Also incorporated in the traverse unit is a potentiometer assembly 106, associated with the shaft 102, which includes three potentiometers or rheostats, the two, 62, 63, identified above, and a third potentiometer 108 having an arm 108a (see also FIG. 13). They are all controlled simultaneously with rotation of the shaft, the arms 62a, 63a, 108a, being mounted on the shaft. These potentiometers are also incorporated in the circuit of FIGS. 23–26 and their functions will be described in detail hereinbelow. The potentiometer 108 is not associated with a relay, as are the potentiometers 62, 63, but it controls signal lights (FIGS. 14, 24).

As a general statement of the operation of the traverse control unit 67, as the table 34 moves "left", as indicated in FIG. 2, the taper bar 68 is so inclined that the actuating arm 72 swings upwardly, i.e. in counterclockwise direction. This rotates the shaft 74 (FIG. 11) and thus the gear 90 in that direction, and rotates the pinion gear 104 and the shaft 102 in the opposite direction, and actuating the potentiometers in corresponding direction. The actuating arm is so swung by the spring 94 which maintains it in following engagement with the taper bar. When the table moves to the right, the taper bar positively swings the actuating arm in clockwise direction, against the action of the spring 94 Accordingly in movement of the table in each of its opposite directions, the potentiometers 62, 63, 108, together are moved in corresponding directions.

The length of the actuating arm 72 and the inclination of the taper bar 68 are so pre-selected that (FIG. 10) the angle 109 of throw of the arm, throughout the full movement of the table, produces rotation (FIG. 11) of the gears 90 and 104 such that the arms of the potentiometers 62, 63, 108, swing nearly, but less than, a full revolution. This movement of the potentiometers will be referred to again hereinbelow.

The apparatus of the invention is well adapted to being retrofitted to an existing grinder. Sometimes it may be difficult to mount the taper bar 68 in a most desired position, and in different circumstances the taper bar may be mounted in different positions, such as represented in FIGS. 7 and 9 respectively. It will be seen that the taper bar in these figures is mounted in oppositely inclined positions, and to accommodate that, actuating arm 72 is mounted in opposite directions. Also, the tension spring 94 may be mounted oppositely, as shown in FIG. 12. These opposite mountings provide for movement in the desired directions of various elements and components in the different mountings.

Reference is made to the remote control unit 66 identified above, included in FIG. 1, and shown in detail in FIGS. 14–20. Generally, and briefly, the remote control unit includes manually manipulatable potentiometers, identified as left and right, that cooperate with the left and right potentiometers 62, 63, shown in FIGS. 11 and 13. These potentiometers are included in the electrical circuit of FIGS. 23-26 and their functions and inter actions will be described hereinbelow.

The mechanical construction of the remote control unit is shown best in FIGS. 14, 15. The unit includes a suitable casing 114 (FIG. 14), front and rear mounting plates 116, 118, a left hand shaft 120, and a right had shaft 122. Fixedly mounted on the left hand shaft 120 is a cylindrical element 124 (FIG. 16) having a radial Pin 126 extending outwardly therefrom, and a reduced hub 128. Mounted on the left and right hand shafts, are pulleys 130, 132, on which is trained a belt 134, these pulleys and belts preferably being toothed.

The pulley 130 is free running on the left hand shaft and is fitted to the element 124, with the hub 128 received in a recess 136 in the pulley. The pulley has axial pins 138 extending to the far side of the element 124 engageable with the radial pin 126, under certain conditions, as will be referred to.

The pulley 132 is fixed on the right hand shaft 122 and the movement of the pulleys will be referred to again hereinbelow.

The mounting plate 116 (FIG. 15) may be mounted on the casing, and the shafts 120, 122, extend therethrough and through a front plate 140 (FIG. 14), where they are provided with LEFT and RIGHT knobs 142, 144.

Mounted on the opposite, or inner, ends of the shafts 120, 122, are potentiometers or rheostats 146, 148, (FIG. 15 and see also FIG. 20) having arms 146a, 148a. These potentiometers, as indicated above, cooperate with the potentiometers 62, 63 (FIGS. 23, 25). For convenience, the potentiometers 62 and 146 may be referred to as a Potentiometer unit and similarly, the potentiometers 63 and 148 may be referred to as a potentiometer unit.

Also mounted at the front of the remote control unit 66 (FIG. 14) is a manual switch, or toggle switch, 150 which is selectively positionable between LEFT and RIGHT positions as indicated. Also mounted at the front plate 140 are manual adjustment members 152, 154, for use in LEFT slow approach, and RIGHT slow approach, as will be described hereinbelow. FIG. 14 shows these adJustment members as including shafts 156, 158, associated with potentiometers 164, 166, (FIG. 25) and having radial arms 164a, 166a, operable with the potentiometers.

Also mounted on the front plate 140 (FIG. 14) is a series of visual signal indicators, indicated as a group at 168 (see also FIG. 24). These indicators are LED's and are individually numbered by numerals 170. The center one, the numeral 0, represents the center position of the table in the grinder, and those at the opposite sides of that center LED, and at the ends of the series, represent the positions of the table toward the ends of the maximum range of movement of the table. The specific functioning of these LED's will be referred to again hereinbelow.

Above the LED's as viewed in FIG. 14, are LEFT and RIGHT signal lights 172, 174, (see also FIG. 26) to indicate the direction of movement of the table. In general, in the use of the remote control unit 66, the potentiometers 146, 148, (FIGS. 14, 15) are rotated by the shafts 120, 122, in response to manual rotation of the knobs 142, 144 (FIG. 14). In response to turning the RIGHT knob 144, the potentiometer 148 (FIGS. 14, 20) is turned, as stated, and the pulley 132 rotates with the shaft, and acting through the belt 134, turns the pulley 130 which is free running on the shaft 120. Correspondingly, upon manual manipulation of the LEFT knob 142, the shaft 120 is rotated and the corresponding potentiometer 146 is rotated or adjusted, but in most instances, it does not turn the pulley 130. These potentiometers 146, 148, have a median position representing the median position of the table in its maximum range of movement. This position, in this case, is an upper position, as represented in FIGS. 17-20 The position is also indicated in FIG. 14 where the knobs 142, 144, are in a median position as indicated by the pointers 175 indicating the number 50, in a series of 0-100, on the knobs. In this position the potentiometers 146, 148, (FIG. 20) are adJacent that median position, slightly displaced therefrom. In this figure, vertical lines 176 are shown passing through the shafts 120, 122, and the potentiometers arms 146a, 148a, are respectively on the left and right sides of the vertical lines In this position also, the radial pins 126, and axial pins 138 (FIGS. 17-19) are adjacent each other. In most cases, these potentiometers are adjusted to represent movements toward the ends of the table, and in making such adJustments, the right hand knob 144 (FIG. 14) is adjusted to the right, this rotating the pulley 132 (FIG. 15), and through the belt 134, the pulley 130 also to the right. This does not move the left hand shaft 120. Because the pins 138 are positioned to the right of the pin 126 (FIG. 17), movement of the RIGHT knob, and the shaft, clockwise or to the right, does not move the shaft 120, or potentiometer 146. The knob and shaft can be moved to selected positions 138a, 138b, the angles of these movements being indicated at 138c, 138d. This latter condition is indicated by the full line position of the pin 126 at the top (FIG. 17). In a similar manner, the LEFT shaft 120 can be rotated counterclockwise or to the left by the corresponding LEFT knob 142 (FIG. 14) which moves the pin 126 (FIG. 17) away from the pins 138, to selected positions 126a, 126b, this latter movement representing movement of the potentiometer toward the left hand end of the maximum range of movement of the table. The angles of movement of the pin 126 are indicated at 126c, 126d.

When the potentiometers 146, 148 (FIG. 20), are moved to their extreme outer adJusted positions (FIG. 17), as indicated by the locations of the pins 126b, 138b, the table is enabled to move through its maximum range.

Not only can the potentiometers 146, 148, be moved in opposite directions toward the respective ends of the table, as represented in FIGS. 17, 20, but it is also possible to move both of them to positions corresponding to one side of the center, toward the end of the table. Such a position is represented in FIG. 18. In this case the RIGHT knob 144 can be moved to its extreme right position as represented by the axial pins 138 in their limit position 138e, and the radial pin 126 in a position indicated at 126e at the same end of the range of movement, but spaced apart from the pins 138 at an angle 138f. In a similar manner the LEFT potentiometer may be moved to its extreme left position represented by position 126f, and the pins 138 at position 138g, at the same side of the center, but spaced from the pin at 126f, an amount indicated by the angle 126g.

According to the settings of FIGS. 17, 18, the table moves through smaller ranges, at the various locations in the maximum range of its movement.

As noted above, the potentiometers 146, 148, cannot overlap, but are limited to: their minimum spaced position represented in FIG. 20 by the interengagement of the radial pin 126 and axial pins 138 (FIGS. 15, 17). This establishes a minimum range of movement of the table. If it is desired to have that same minimum range of movement, rather than at the center of the maximum range, to be located at one end of that range, this can be easily accomplished for either the RIGHT or the LEFT. If it is desired to have this minimum range established at the RIGHT, the LEFT knob (FIG. 14) is turned clockwise or to the RIGHT, and the radial pin 126 (FIG. 19) turns the pulley 130 and, through the belt 134, turns the pulley 132. Thus both potentiometers are moved to the RIGHT, and maintained at the same minimum spacing. The opposite effect is accomplished by turning the RIGHT knob (FIG. 14) counterclockwise or to the LEFT, and an opposite movement is produced (FIG. 19), that is, the pulley 132 acting through the belt 134 drives the pulley 130, and the axial pins 138 engage the radial pin 126 and the two shafts, and potentiometers, are turned together. In this case also, the minimum range is maintained throughout the movement, and that minimum range can be located at any position in the left hand part of the maximum range desired, according to the amount of movement of the knob 144. This minimum range is indicated by the pins 126, 138, being closely adjacent in each of the locations shown.

The potentiometers 146, 148, are limited in their outward movement, that is, in advancing or voltage-increasing direction, by internal stop means.

FIG. 21 shows a portion of the electrical control circuit that includes the relays 64, 65, 59.

Attention is directed to the electrical control circuit of FIGS. 23-26, which includes certain of the electrical elements referred to above in the description of the mechanical structure of the various components. Coordinates are provided in the control circuit, for convenience in locating the elements referred to. The coordinates will be indicated in parenthesis in the following description, following the respective elements identified.

A suitable electrical source 190 (C-1) is provided, and a step down transformer 192 has a secondary 192S of suitable voltage such for example as 14V. The output leads to a rectifier 194, the DC output of the rectifier being regulated by a regulator 196, and the output of this regulator of 12V DC supplies the power requirement of the entire control circuit.

The potentiometers of FIGS. 11, 13, are incorporated in the circuit, 62 (E-3), 63 (G-3), 108 (E-13), and it is to be noted, as mentioned above, that these three potentiometers are actuated simultaneously, by the movement of the table, through the actuating arm 72 (FIG. 11).

The remote control potentiometers 146, 148, (FIGS. 14, 20) are shown in the circuit (F-4, I-4).

The potentiometers 62, 146, are associated with the LEFT movement of the table, and the potentiometers 63, 148, are associated with the RIGHT movement. Included in the circuit are comparators 198 (F-6), 200 (H-6), respectively associated with the LEFT and RIGHT directions of movement.

The potentiometers 146, 148, (see also FIG. 20) are set respectively by the knobs 142, 144, (FIG. 14). In the movement of the table to the LEFT for example, the potentiometer 62 (E-3) is moved in advancing direction, increasing the voltage applied to the pin 3 of the comparator 198. The setting of the potentiometer 146 (F-4) controls the voltage applied to pin 2. The voltage controlled by the potentiometer 62 (E-3) at this point is at a value less than that at pin 2. In this condition, the output of the comparator 198, at pin 6 is LO, and when the table continues to move, the voltage at potentiometer 62, as controlled by the arm 62a, increases, and when it exceeds the voltage at pin 2, the output of pin 6 goes HI.

A similar operation takes place in the opposite direction of the table, in association with the corresponding potentiometers, namely 63 (G-3), 148 (I-4), comparator 200 (H-6).

The traverse potentiometers 62, 63, are connected to opposite polarities, and moved together, and in either extreme position, the voltage of one of the potentiometers is a maximum, or 12V DC, while that of the other one is zero. It is to be noted that the remote potentiometers 146, 148, are also connected to opposite polarities. When the potentiometers 146, 148, are set at normal minimum spacing, adjacent the center, as in FIG. 20, they represent voltages near but different from the midpoint of the 12 V of the output of the rectifier 194 (C-5), in this case approximately 5.9 V and 6.1 V respectively. In each case, the 5.9 V or 6.1 V, respectively, may also be referred to as minimum voltage, and the 12 V at the end of range movement referred to as maximum voltage.

The traverse potentiometers 62, 63, are so arranged and connected that the maximum voltage value thereof is reached when the table is at the respective ends of its maximum range of movement, and when the corresponding remote control potentiometers 146, 148, are set at their maximum voltage settings, the voltages of the traverse potentiometers 62, 63, are similar to those of the remote potentiometers so that the maximum voltage of the traverse potentiometers is reached at the positions noted, namely at the ends of the maximum range of movement. In a similar manner, when the remote potentiometer is set at a lesser value, the voltage of the traverse potentiometer reaches a lesser value at the corresponding point, which is short of the end of the maximum range of movement. When the voltage set by the remote potentiometers is reached by the voltages controlled by the traverse potentiometers, the reversal of the table is produced as set out hereinbelow.

To correlate the mechanical movements with the functioning of the elements in the electrical circuit, reference is made to FIGS. 7, 2, where the traverse unit 67 is viewed at the front of the machine. As the table moves to the LEFT, as so viewed, the taper bar 68 effects movement of the actuating arm 72 in counter-clockwise direction, and (FIG. 11) the gear 90 also moves counter-clockwise, and the gear 104 in clockwise direction, and correspondingly the potentiometers 62, 63, 108, also in clockwise direction. This clockwise direction as applied to potentiometer 62 (E-3) moves the arm 62a thereof. In this condition the voltage established by that potentiometer is increasing, and as noted above, when that voltage at pin 3 of the comparator 198 exceeds that of pin 2, the output at pin 6 goes HI.

When this happens, the output is conducted to diode 202 (F-7), then to pin 4 of flip-flop 204 (G 9) resulting in the following steps. Pin 1 of the flip-flop goes LO, pin 4 of the gate 206 (G-11) goes LO, producing a forward bias on the solid state relay 208 (I-12) and turning it ON. This energizes the relay 64 (I-13) (see also FIG. 6). Simultaneously therewith, the solid state relay 210 (F-12) is reverse biased, and therefore turned OFF, and the relay 65 (F-13) (see also FIG. 6) is de-energized.

The energization of the relay 64 (I-13) and the de-energization of the relay 65 (F-13) effects reversal of the table. The direction of the movement of the table in the foregoing description, was to the LEFT, and upon the reversal noted, moves to the RIGHT, and in this movement, the traverse potentiometers 62, 63 (FIGS. 11, 13) rotate in counter-clockwise direction. In this case also it is assumed that the remote potentiometer 148 (I-4) is adjusted to a predetermined setting, producing a corresponding voltage at pin 2 of the comparator 200 (H-6). Upon movement of the traverse potentiometer 63 (G-4) as noted, the voltage established by that potentiometer increases and is conducted to pin 3 and when it exceeds the voltage at pin 2, which was theretofore higher than at pin 3, the output at pin 6 goes HI, and transmits a corresponding signal to diode 212 (H-7), and then to pin 6 of flip-flop 204 (G 9). The output at pin 1 of the flip-flop 204 now becomes HI and correspondingly, pin 4 of gate 206 (G-11) also goes HI. Accordingly the solid state relay 210 (G-12) is forward biased and turned ON. This energizes the relay 65 (F-13). At this point the solid state relay 208 (1-12) is reversed biased and this de-energizes the relay 64 (I-13). This again effects reversal of the table, which then moves to the LEFT.

The signal lights 168 identified above in connection with FIG. 14, are included in the circuit, in FIG. 24 at the top. The signal lights are divided into two groups, one light at the center being a zero position, and as the table moves, the signal lights corresponding to that direction of movement are lighted, lighting serially in the direction of movement, as each light being lighted, the previous one being extinguished, in each direction. There are ten lights in each half, each light indicating 1/10 th movement of the table in the respective half of the total range of movement.

The operation and functioning of the signal lights is as follows. The potentiometer 108 (E-13) (see also FIG. 11) as indicated above moves with the traverse potentiometers 62 (E-4), 63 (G 4). If the table is moving to the LEFT, for example, the potentiometer 108 (E-13) is moving clockwise, and the voltage at pin 5 of the line-dot bar drivers 228, 230, 232 (C-10, C-12, C-14), increases in voltage, and the lights or LED's light up one at a time from RIGHT to LEFT. These LED's light throughout the range of movement of the table. For example, if the table begins from a central position, and moves to the LEFT, the LED's connected with the driver 230 light up serially, and as each one is lighted, the previous one is extinguished., as the table then moves in the other direction, those LED's are lighted and extinguished in the same manner in the opposite direction, and after the table moves past the center, the same operation is performed in connection with the other LED's.

In a standard surface grinder (30), not only is the table (34) reciprocated longitudinally, but there is relative movement in in/out directions, as is known. According to the design preferences of the various manufacturers, the table may be moved in/out and the grinding wheel held stationary, as represented in the present case, or vice versa, i.e. the grinding head, with the grinding wheel, moved in/out and the table held stationary. In either of the latter two cases, the apparatus of the present invention may be applied for producing and controlling the movement, as well as in the longitudinal movement of the table.

An additional great advantage of the apparatus is that the remote control can be adjusted while the table is moving, i.e. there is no need to stop the table for that purpose.

The term table as used in the claims is to be considered to cover carriage also, where appropriate.

We claim:

1. Apparatus for controlling a machine having a reciprocating table, movable throughout a predetermined maximum range, and driving means for moving the table, comprising,
   a series of visual signal elements spaced along a line corresponding to the line of movement of the table, and
   means actuated by the movement of the table operable for energizing the signal elements selectively according to the movement of the table, and thereby indicating the positions of the table in said maximum range of movement according to the identity of the signal elements energized.

2. Apparatus according to claim 1 wherein,
   the signal elements are energized individually and singly on each side of the center of the line of the signal elements, corresponding to the side of the center the table is positioned on its line of movement, and are de-energized in the same manner on the opposite side of the center of the line of the signal elements.

3. Apparatus according to claim 2 and including,
   a shaft rotatable by the table, and control elements controlled by the shaft for in turn controlling the movements of the table,
   the shaft having a range of rotation corresponding to the maximum range of movement of the table, and
   wherein the energizing means being actuated by the shaft and operable for energizing the signal elements individually according to the position of the shaft and thereby according to the position of the table.

4. Apparatus according to claim 3 wherein,
   the signal elements are LED's,
   the apparatus includes line-dot bar drivers,
   a light control adjustable potentiometer mounted to the shaft,
   the shaft having an arm movable by the shaft throughout a range corresponding to the range of movement of the table, and thereby operable, acting through the line-dot bar drivers for energizing the LED's individually according to the position of the table in the table's range.

5. Apparatus according to claim 4 and including, a plurality of control means, each for controlling the movement of the table in each direction,
   each said control means including a traverse potentiometer adjustably moved by the movement of the table in the corresponding direction, and throughout a range corresponding to the maximum range of movement of the table, and
   the traverse potentiometer being operable for energizing the LED's.

6. Apparatus for signaling the movements of a reciprocating member movable along a main line in a predetermined maximum range, in operable association with driving means for driving the reciprocating member, comprising,
   a series of visual signal elements spaced along a signal line corresponding to the main line,
   voltage controlled means for energizing the signal elements individually,
   first means for developing a first voltage in response to movement of the reciprocating member, and
   second means for manually adjustably predetermining a second voltage in opposition to the first voltage and thereby for energizing the signal elements along said signal line to indicate the position of the reciprocating member along its said main line.

7. Apparatus according to claim 6 wherein,
the reciprocating member is operable for controlling said first means for establishing a minimum first voltage at the center position of the reciprocating member in said main line, and
the reciprocating member is operable for controlling the first means for developing the first voltage in each direction from said center position.

8. Apparatus according to claim 7 wherein,
the voltage controlled means includes separate units, each operably associated with a respective direction of movement of the reciprocating member from said center position to the corresponding end of its range of movement.

9. Apparatus according to claim 8 wherein,
each unit includes a traverse potentiometer actuated by the reciprocating member, and said second means is constituted by a remote potentiometer, and
the traverse potentiometers of each unit are operated from a minimum position only in the direction of the movement of the reciprocating member from said center position to the end of the range corresponding to the unit associated therewith, and incapable of being operated from the minimum position in opposite direction corresponding to movement of the reciprocating member to the end of the range in opposite direction.

* * * * *